United States Patent [19]
Dershem

[11] Patent Number: 5,969,036
[45] Date of Patent: Oct. 19, 1999

[54] EPOXY-CONTAINING DIE-ATTACH COMPOSITIONS

[75] Inventor: Stephen M. Dershem, San Diego, Calif.

[73] Assignee: The Dexter Corporation, Windsor Locks, Conn.

[21] Appl. No.: 08/879,580

[22] Filed: Jun. 20, 1997

[51] Int. Cl.$^6$ ....................................... C08J 3/10
[52] U.S. Cl. .......................... 524/779; 524/701; 524/720; 524/789; 528/95; 528/99; 528/119; 528/413
[58] Field of Search ............................... 528/99, 119, 413, 528/95; 524/701, 720, 789, 779

[56] References Cited

U.S. PATENT DOCUMENTS

| | | | |
|---|---|---|---|
| 3,994,949 | 11/1976 | Meyer et al. | 260/453 |
| 4,028,393 | 6/1977 | Rottloff et al. | 260/453 |
| 4,485,221 | 11/1984 | Krueger et al. | 525/507 |
| 4,535,150 | 8/1985 | Hunter | 528/489 |
| 4,604,452 | 8/1986 | Shimp | 528/422 |
| 4,716,184 | 12/1987 | Kagawa et al. | 523/310 |
| 4,748,280 | 5/1988 | Mylari et al. | 568/595 |
| 4,785,075 | 11/1988 | Shimp | 528/422 |
| 4,810,776 | 3/1989 | Karlhuber et al. | 528/488 |
| 5,358,992 | 10/1994 | Dershem et al. | 524/439 |
| 5,447,988 | 9/1995 | Dershem et al. | 524/780 |

FOREIGN PATENT DOCUMENTS

| | | | |
|---|---|---|---|
| WO96/20242 | 7/1996 | WIPO . | |
| WO 96/35760 | 11/1996 | WIPO | C09J 4/00 |

OTHER PUBLICATIONS

Bauer et al., "Kinetics and modelling of thermal polycyclotrimerization of aromatic dicyanates" *Acta Polymerica*, 37:715–19 (1986).

Grigat and Putter, "New Methods of Preparative Organic Chemistry VI: Synthesis and Reactions of Cyanic Esters" *Angew. Chem. (Intl Ed.)*, 6(3):206–218 (1967).

Shimp, D. A., "The Traslation of Dicyanate Structure and Cyclotrimerization Efficiency to Polycyanurate Properties" *PMSE Preprints, ACS Meeting*, 54:107–13 (1986).

*Primary Examiner*—Melvyn I. Marquis
*Assistant Examiner*—D. Aylward
*Attorney, Agent, or Firm*—Gray Cary Ware & Friedenrich; Stephen E. Reiter

[57] ABSTRACT

In accordance with the present invention, there are provided novel compositions for attaching semiconductor devices to substrates. Invention compositions comprise liquid monomer vehicle comprising hydrophobic cyanate ester monomer(s) and epoxy monomer(s), electrically and/or thermally conductive filler, a metal catalyst, and an imidazole, preferably in the substantial absence of non-reactive diluents.

30 Claims, 2 Drawing Sheets

EPOXY-CONTAINING DIE-ATTACH COMPOSITIONS

FIELD OF THE INVENTION

The present invention relates generally to the field of adhesives, and more particularly to die-attach compositions for attaching semiconductor devices to carrier substrates.

BACKGROUND OF THE INVENTION

Cyanate ester resins, developed during the 1980s, have joined epoxy resins and bismaleimide resins as the third major class of thermosetting resins. Polycyanurates or cross-linked cyanate resins are prepared by the cyclopolymerization of aromatic cyanate esters. These cyanate esters are bisphenol derivatives containing a plurality of cyanate functional groups. When heated, the cyanate functionality undergoes exothermic trimerization to form substituted triazine rings. Subsequent curing produces the thermosetting resin and forms three-dimensional networks of oxygen-linked triazine rings and bisphenol units, termed polycyanurates. Because no leaving groups or volatile byproducts are formed during cure, the cyclotrimerization curing reaction is classified as addition polymerization.

The formation of substituted triazine rings from the cyclic addition of three cyanate groups appears to proceed via a series of bimolecular collisions in step-growth fashion (Shimp, PMSE Preprints, ACS Meeting, New York, pp. 107–13 (4/86); Bauer et al., Acta Polymerica, 37:715–19 (1986)). This mechanism is facilitated by the transient stability of active hydrogen addition compounds and proton transfer from the imidocarbonate intermediate to subsequently colliding cyanates. The role of soluble transition metal compounds is primarily coordination, gathering cyanate groups in proximity to form a ring.

Trimerization rates of uncatalyzed liquid or molten dicyanates are impractically slow, being largely a function of the concentration of active hydrogen impurities, including moisture. Traditional catalysts are transition metal carboxylates dissolved in organic solvents (e.g., methyl ethyl ketone). Efficient curing of high purity monomers and prepolymers requires the incorporation of nonvolatile hydroxyl compounds, while safe catalysis of hot melt formulations requires enhanced solubility of metal carboxylates and chelates. Both needs have been met by predissolving the coordination metal compound in a nonvolatile liquid alkylphenol (e.g., nonylphenol, Shimp, U.S. Pat. No. 4,604,452 (1986), Shimp, U.S. Pat. No. 4,785,075 (1988)).

Cyanate esters will form addition compounds with phenols, alcohols, amines, imidazoles, and most other labile hydrogen compounds upon heating or base catalysis (Grigat et al., *Angew. Chem. (Int'l Ed.)*, 6:206 (1967)). Analogous to blocked isocyanates, these cyanate adducts are thermally reversible, favoring the unblocked state at temperatures in the 150–200° C. range and above. These addition products are primarily of importance as catalytic intermediates in ring formation.

The addition of water to the cyanate group forms an imidocarbonic acid intermediate which rearranges to the more stable carbamate structure. Carbamates decompose with evolution of carbon dioxide gas at temperatures in the vicinity of 200° C. and above. In contrast to isocyanates, which react nearly instantly with water at room temperature (and over a period of hours with alcohols), uncatalyzed cyanates are stable for months in blends containing water, alcohols, and phenols. Uncatalyzed o-alkylated cyanates (e.g., 2,6-dialkyl cyanates) are essentially non-reactive with these active hydrogen sources. Catalysts which accelerate the addition of hydroxyl compounds (including water) to cyanates include tertiary amines, most coordination metal cure catalysts, and acids.

For these reasons, maximum hydrolytic and thermal stabilities are insured when absorbed moisture is minimized by proper storage of resins and prepregs or, if present, removed via vacuum molding procedures.

Cyanate esters function as curing agents for epoxide resins through a combination of oxazoline ring formation (co-reaction) and catalysis of epoxide homopolymerization (Shimp et al., 33rd Int'l SAMPE Symp. and Exhib., Anaheim, CA (3/7–10/88). Essentially, cyclotrimerization proceeds initially and the cyanurate rings which form function as nucleophilic catalysts for both oxazoline formation and polyetherification reactions. As little as 35% by weight cyanate ester monomer or prepolymer can convert equivalent excesses of epoxide. Cyclotrimerization catalysts also accelerate epoxide consumption in such hybrid systems.

Cyanate esters are currently employed in rapidly curing adhesive compositions used to bond semiconductor devices or chips, also known as dice, to carrier substrates. Such adhesive compositions may include, in addition to the cyanate ester, thermally and/or electrically conductive filler and a curing catalyst dissolved in alkylphenol.

One of the most outstanding characteristics of cyanate ester homopolymers is their low dielectric loss properties. While chemical compositions containing cyanate ester homopolymers include appreciable percentages of electronegative elements (about 10% oxygen and 10% nitrogen for many common polymers), their symmetrical arrangement around electropositive carbon atoms creates balanced dipoles of short moments which store surprisingly little electromagnetic energy. Dielectric constants decrease slightly when the frequency is increased into the gigahertz ($10^9$ Hz) range. The multivalent transition metal cations and bulky carboxylate anions used as cure catalysts generally make no measurable contribution to energy storage (Dk) or to dissipation of stored electromagnetic field energy as leakage currents (Df).

Cyanate ester adhesive compositions have eliminated many of the deficiencies inherent in epoxy adhesives and polyimide adhesives, such as low glass transition temperature, high degree of ionic contamination, retention of solvent, and lengthy cure. However, presently available cyanate ester-containing attach paste compositions exhibit some deficiency with respect to homogeneity, i.e., such pastes have a tendency to become nonhomogeneous at ambient temperatures. Accordingly, there still remains room for improvement of die-attach pastes containing electrically conductive filler and polycyanate ester monomer in a variety of ways, e.g., in assuring the stability of paste homogeneity, in extending the pot life of such die-attach pastes, in reducing the cost of preparation, as well as the ease of preparation, by avoiding the use of potentially detrimental components (e.g., alkylphenols are acidic species, which are potentially corrosive), by avoiding the use of volatile components (which upon cure may vaporize, resulting in reduced wire bondability due to contamination of bond pads, and/or which may lead to the creation of voids in the cured resin), by having sharper, more rapid (i.e., snappier) curing profiles (thus improving cure cycle time), and the like.

BRIEF DESCRIPTION OF THE INVENTION

In accordance with the present invention, novel compositions have been developed for the non-hermetic attachment of semiconductor devices to a substrate. Invention compositions comprise monomer vehicle containing at least one hydrophobic cyanate ester monomer and at least one epoxy monomer, a conductive filler, a metal catalyst, and an imidazole. Optionally the monomer vehicle is liquid, and the composition is substantially free of nonreactive diluents.

DETAILED DESCRIPTION OF THE INVENTION

Figure 1:
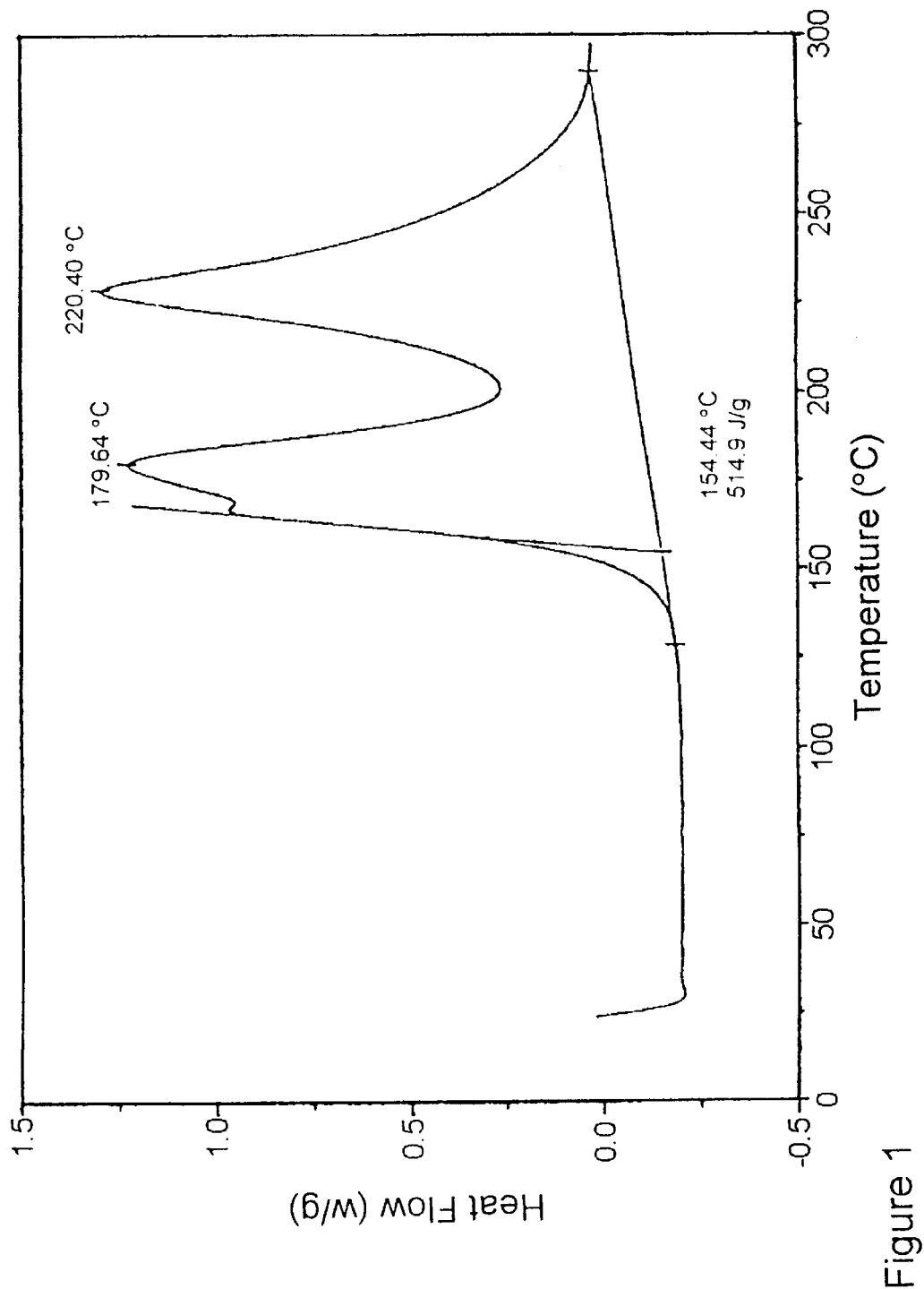
FIG. 1 presents the graphical result of the differential scanning calorimetry analysis of sample 13 (see Table 1 for full details). Sample 13 included cyanate and epoxy monomers in a 1:1 ratio, along with a cobalt catalyst, and presented a severe and broad bimodal reaction profile when cured.

In accordance with the present invention there are provided paste compositions for the non-hermetic attachment of semiconductor devices to a substrate, said compositions comprising a monomer vehicle comprising at least one hydrophobic polycyanate ester monomer and at least one epoxy monomer, an electrically and/or thermally conductive filler, a metal catalyst, and an imidazole.

Die-attach paste compositions of the invention employ liquid monomer vehicle comprising at least one hydrophobic polycyanate ester monomer and at least one epoxy monomer, preferably in the substantial absence of non-reactive diluents. It has been found that epoxy-containing polycyanate ester monomer has superior performance when compared to polycyanate ester compositions that do not contain epoxy monomers. For example, the cure rate of both the polycyanate ester and epoxy monomer components are synergistically improved by the use of a dual catalyst system according to the invention.

Monomer vehicle contemplated for use in the practice of the present invention is preferably liquid under ambient conditions. The term "ambient" as used herein refers to temperatures of about 25±2° C. A liquid monomer vehicle ensures that paste compositions will not be compromised by monomer crystallization during use, but will maintain a homogeneous consistency, and also avoids the need for extraneous solvent/diluent (e.g., alkylphenol) as an aid to vehicle preparation. While it is possible to heat a sample of paste until all of the monomer is melted, this puts an unreasonable burden on the user. Furthermore, the user may not be able to ascertain when all of the monomer is melted. Use of a nonhomogeneous paste could result in failures in die-attach.

In accordance with the present invention, the use of a polycyanate ester or epoxy monomer having a melting point above ambient temperature is not precluded, even in the absence of an alkylphenol as solvent/diluent and co-catalyst, because such a monomer can be combined with one or more other monomers which are selected so that the melting point of the resultant monomer mixture is lowered to provide a liquid monomer vehicle at ambient temperature. Liquid monomer vehicles contemplated herein include vehicles selected from the group consisting only of liquid monomers; vehicles selected from the group consisting of solid monomer(s) miscible and/or soluble in liquid monomer(s); and vehicles selected from the group consisting of solid monomers which, when combined, provide a liquid monomer mixture.

The liquid monomer mixtures of the invention are preferably not too viscous, as high viscosity causes handling problems, difficulty in mixing and degassing the mixture, and end use concerns (e.g., viscous mixtures have delayed dispensing times, more tailing problems, retarded die placement times, and the like). Preferably, the viscosity of the liquid monomer mixture is no more than about 2500 centipoise (cp), and more preferably, the viscosity is about 1500 cp or less.

Hydrophobic cyanate ester monomers contemplated for use in the practice of the present invention contain two or more ring-forming cyanate (—O—C≡N) groups which cyclotrimerize to form substituted triazine rings upon heating (or co-react with epoxies to form oxazoline linkages). Because no leaving groups or volatile byproducts are formed during curing of the cyanate ester monomer (or during co-cure with epoxies), these curing reactions are referred to as addition polymerization. Hydrophobic monomers provide moisture resistance properties by way of the hydrophobic backbone to which the reactive functional groups are attached in each monomer. The size of this hydrophobic aliphatic or aromatic mid-group must, of necessity, be relatively large. The advantage of catalyst cure synergism as demonstrated in the present invention is reduced by the presence of these large hydrophobic moieties, but is still significant. Suitable polycyanate ester monomers that may be used in the practice of the present invention include, for example:

1,1-bis(4-cyanatophenyl) methane;
1,1-bis(4-cyanatophenyl)ethane;
2,2-bis(4-cyanatophenyl)propane;
1,3-bis[2-(4-cyanatophenyl) propyl]benzene;
1,1-bis(4-cyanato-3,5-dimethylphenyl) methane;
1,1,1,3,3,3-hexafluoro-2,2-bis(4-cyanatophenyl) propane;
XU 71787™ (Dow Chemical);
and the like.

Cyanate ester monomers utilized in accordance with the present invention may be readily prepared by reacting appropriate dihydric phenols with a cyanogen halide in the presence of an acid acceptor (See, for example, U.S. Pat. Nos. 3,994,949, 4,028,393 and 4,748,280, each of which is hereby incorporated by reference herein).

In certain applications, it is highly desirable to use monomers that impart hydrophobicity to the cured thermoset polymer. This feature is particularly desirable when the cured polymer is required to withstand exposure to moisture, especially at elevated temperatures. Suitable commercially available cyanate ester monomers that would impart this property include RTX-366™, Arocy M-10™, and Arocy F-10™ (all from Ciba), XU 71787™, and the like, with RTX-366™ and XU 71787™ being the most hydrophobic, and therefore presently the most preferred.

Monomer(s) which may be combined with polycyanate ester monomer is selected based on the following criteria: the monomer(s) should be soluble in or miscible with polycyanate ester monomer and should be non-reactive with polycyanate ester monomer at ambient temperatures, unless such a reaction is reversible at temperatures above ambient temperature. Preferably, the molar ratio of the cyanate ester to the added monomer should be between about 1:2 and about 5:1. More preferably, the molar ratio is between 1:1 and 3:1.

Epoxy monomers that may be combined with polycyanate ester monomer(s) in accordance with the present invention are selected from those monomers that are sufficiently reactive to yield a desirable cure profile. Aromatic epoxy monomers tend to be preferable to aliphatic monomers, as aromatic monomers are typically more reactive. For example, glycidyl ether, glycidyl ester, and glycidyl amine-type epoxies typically work well in accordance with the present invention.

In one embodiment of the present invention the epoxy monomer has the structure:

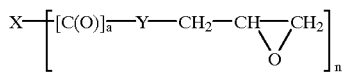

wherein:
X is monovalent or polyvalent aliphatic, substituted aliphatic, aromatic, substituted aromatic, or polyether;
Y is O or NR, wherein R is

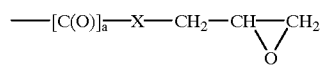

a = 0 or 1, a=0 or 1,
n=1, 2, 3 or 4.

When used in reference to the above-described monomer, "aliphatic" refers to a straight chain or branched chain hydrocarbon radical containing about 4 to about 40 carbon atoms in its molecular structure. "Substituted aliphatic" refers to a hydrocarbon radical further bearing one or more substituents such as hydroxy, alkoxy (of a lower alkyl group), mercapto (of a lower alkyl group), aryl, heterocyclic, halogen, trifluoromethyl, pentafluoroethyl, cyano, cyanomethyl, nitro, amino, carboxyl, sulfonyl, sulfonamide, and the like. "Aromatic" refers to any hydrocarbon radical, whether or not it contains atoms other than hydrogen and carbon, that has aromatic character as understood by those skilled in the art. "Substituted aromatic" refers to aromatic radicals further bearing one or more substituents as set forth above with respect to the substituted aliphatic moiety. "Polyether" refers to compounds of the structure:

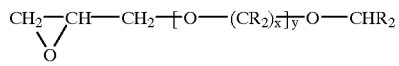

wherein:
x=1–4;
y=2–100; and
R=H or lower alkyl.

Preferred epoxy monomers contemplated for use in the practice of the invention include diglycidyl ether of bisphenol F (sold as, e.g., Epiclon-830LVP™ and RSL-2007™), poly(propylene glycol) diglycidyl ether (PPGDGE), N,N,N', N'-tetraglycidyl-4,4'-diaminodiphenylmethane, triglycidyl tris(hydroxy phenyl)methane, glycidated phthalic acid, glycidated isophthalic acid, glycidated terephthalic acid, glycidated p-amino phenol, glycidated bisphenol E, glycidyl ether of bisphenol F, bisglycidyl ether of Bisphenol A, glycidated dimer acid, and the like. The presently most preferred epoxy monomer is the diglycidyl ether of bisphenol F, preferably as sold under the tradename Epiclon 830LVP™ (Dainippon Ink & Chemicals, Tokyo). Epiclon 830LVP™ is preferred due to its low hydrolyzable chloride levels ($\leq 30$ ppm), as well as its desirably low viscosity (~1500 cps @ 25° C.). Also preferred are commercial epoxy monomers such as Heloxy 71™ and Heloxy 505™ (both from Shell), and the like. Both of these epoxy monomers impart flexibility to the cured thermoset as well as hydrophobicity.

In accordance with the present invention, it has been observed that epoxy monomers with higher functional density perform better, on average, than epoxy monomers with lower functional density. Functional density refers to the equivalent weight of the epoxy monomer, or the number of epoxy groups per unit mass of the molecule. Thus, di-epoxy compounds having a lower molecular weight will have a higher functional density, as compared to di-epoxy compounds having a higher molecular weight.

Preferably, embodiments of the invention are a mixture of monomers that result in a stable liquid at room temperature. Also, the resulting compositions are preferably free of non-reactive diluents. This may be achieved by blending miscible monomers that are independently liquid at room temperature, or, where one or more of the monomers are solids at room temperature, by combining them at or near their eutectic point.

The cyanate ester monomers generally have negligible levels of ionic contamination. The epoxy monomers discussed herein, however, can have significant levels of hydrolyzable chloride. The presence of this hydrolyzable chloride reduces the performance reliability of the composition, especially when used in electronic packaging applications. It should therefore be understood that some or all of the epoxy products used herein would be subjected to cleaning steps known in the art prior to their use in the present invention (see, for example, U.S. Pat. Nos. 4,535,150, 4,485,221, and 4,810,776, each of which is hereby incorporated by reference herein). Alternatively, the impact of hydrolyzable chloride present in the epoxy monomers may be rendered insignificant through the addition of an ion exchange material that effectively traps chloride ions as they are formed. The use of such a material is described in U.S. Pat. No. 4,716,184 (which is hereby incorporated by reference herein). A commercially available series of inorganic ion exchange additives that are designed for this purpose are marketed by Toagosei Chemical Industry Co. under the designation IXE™.

Electrically conductive fillers contemplated for use in the practice of the present invention include, for example, silver, nickel, gold, cobalt, copper, aluminum, graphite, silver-coated graphite, nickel-coated graphite fillers, alloys of such metals, and mixtures thereof. Both powder and flake forms of filler may be used in the attach paste compositions of the present invention. Preferably, the flake has a thickness of less than about 2 microns, with planar dimensions of about 20 to about 25 microns. Flake employed herein preferably has a surface area of about 0.15 to 5.0 m²/g and a tap density of 0.4 to 5.5 g/cc. Powder employed herein preferably has a diameter of about 0.5 to 15 microns.

Thermally conductive fillers contemplated for use in the practice of the present invention include, for example, aluminum oxide, aluminum nitride, boron nitride, silicon carbide, diamond, graphite, beryllium oxide, magnesia, and silica. Preferably, the particle size of these fillers will be about 20 μm. If aluminum nitride is used as a filler, it is preferred that it be passivated via an adherent, conformal coating (e.g., silica).

Electrically and/or thermally conductive fillers are optionally (and preferably) rendered substantially free of catalytically active metal ions by treatment with chelating agents, reducing agents, nonionic lubricating agents, or mixtures of such agents. Such treatment is described in U.S. Pat. No. 5,447,988, which is hereby incorporated by reference herein.

Optionally, a filler may be used that is neither an electrical nor thermal conductor. Such fillers may be desirable to impart some other property such as a reduced dielectric constant, improved toughness, increased hydrophobicity, and the like. Examples of such fillers include alumina, silicon dioxide, perfluorinated hydrocarbon polymers (i.e., Teflon™), thermoplastic polymers, thermoplastic elastomers, mica, and the like.

Metal catalysts employed in the practice of the present invention are preferably transition metal acetylacetonates (abbreviated AcAc) or other metal chelates and/or metal soaps. Examples of suitable metals employed herein include cobalt, manganese, tin, zinc, copper and nickel, all in the divalent state; manganese, iron, cobalt and aluminum, all in the trivalent state; tetravalent titanium; metal soaps of all of the above; and the like. The presently most preferred metal catalyst is cobalt(III) acetylacetonate. Preferably, metal catalysts are employed in concentrations of between about 50 and 1500 ppm, relative to the cyanate ester monomer present in the composition. Most preferably, the metal catalyst concentration is about 250 to about 1000 ppm, relative to the cyanate ester monomer.

Imidazoles are preferably used in the practice of the present invention as catalysts for curing the epoxy monomers. Thus, as used in the specification and claims, the term imidazoles refers to any imidazole that is effective at catalyzing the polymerization of an epoxy monomer. In one embodiment, the imidazole has the structure:

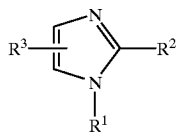

wherein $R^1$ is selected from hydrogen, alkyl, aryl, and cyano; $R^2$ is selected from hydrogen, alkyl, aryl, and cyano; and $R^3$ is selected from hydrogen, alkyl, substituted alkyl, alkylaryl, and substituted alkylaryl. Suitable imidazoles include, for example, 2-ethyl-4-methyl imidazole (also referred to as curimide-24™), imidazole, 1-methyl imidazole, 2-methyl imidazole, 2-undecylimidazole, 2-phenyl imidazole, and the like, with curimide-24™ being the currently preferred imidazole. Preferably, the imidazole is present in a concentration of between about 0.5 and about 15 weight percent, relative to the amount of epoxy monomer (s) present in the composition. Most preferably, the imidazole concentration is between about 1.0 and about 10.0 weight percent, relative to the epoxy monomer(s).

The attach paste compositions of the invention can be prepared by mixing liquid monomer vehicle, optionally treated filler and catalysts (preferably in the absence of alkylphenol), in any suitable mixing means, e.g., in a planetary mixer under vacuum or in an inert atmosphere for about 30 minutes to 1 hour. Thereafter, the resulting homogeneous paste may be subjected to additional mixing on a three-roll mill for fifteen minutes or more at room temperature. The paste is preferably stored at low temperatures, e.g., −40° C., until needed.

As employed herein, the phrases "substantial absence of alkylphenol" and "substantial absence of diluent" refer to alkylphenol and diluent levels below that which can be readily determined using available analytical techniques. It is understood by those of skill in the art that "substantial absence" does not exclude the presence of trace quantities of alkyphenols or diluents, which may be introduced into the die-attach composition of the invention from a variety of sources. Typically, substantial absence refers to levels of alkylphenol or diluent below about 1 part per hundred composition.

Although a substantial absence of diluents is generally preferred in the practice of the present invention, diluents may still be used. If diluents are necessary, it is preferred that mono-epoxides be used. Suitable mono-epoxides include p-tert-butyl phenyl glycidyl ether, butyl glycidyl ether, ethyl hexyl glycidyl ether, cresyl glycidyl ether, various other monoalkyl glycidyl ethers, and the like, as well as mixtures of two or more of the above. Also preferred if diluents must be used are low viscosity diepoxides, such as the diglycidyl ether of neopentyl glycol, the diglycidyl ether of cyclohexane dimethanol, the diglycidyl ester of a dimer acid (e.g., 10,11-dioctyl-1,20-diglycidyleicosanoate), 1,4-butanediol diglycidyl ether, and the like, as well as mixtures of two or more of the above. Alternatively, certain reactive, hydrophobic, epoxy diluents are available. Epoxy monomers that are useful as reactive diluents for such mixtures of hydrophobic cyanate and epoxy monomers include Heloxy 107™, Heloxy 68™, Heloxy 7™, Heloxy 8™, Heloxy 9™ (all from Shell), and the like.

The amounts of liquid monomer vehicle, optionally treated filler and catalysts employed in the attach paste compositions of the invention are important if satisfactory attach pastes are to be obtained. Based on the total weight of the attach paste, the monomer vehicle may be present in the range of about 8 to about 40 weight percent (with about 15 to about 30 weight percent being preferred); the optionally treated filler may be present in the range of about 60 to about 92 weight percent (with about 70 to about 85 weight percent being preferred); and the catalysts are present in the amounts discussed above.

It may be desirable to incorporate one or more additives in attach paste compositions of the invention in order to alter certain characteristics. Examples of such additives include, for example, fumed silica, bleed control agents, certain antioxidants, ion exchange additives, and the like.

Incorporation of a small amount of fumed silica may be beneficial in that it reduces the amount of liquid bleed that can occur during the curing process. Specifically, introduction of fumed silica reduces the amount of uncured monomer that wicks out onto the substrate. Minimizing liquid bleed is desirable since excessive spread of monomer can result in contamination of the die being attached to the substrate. The addition of a small amount of fumed silica can also be used to increase the thixotropic index of a paste. This effect is particularly important when low surface area metal fillers are employed in the preparation of an attach paste. In the absence of fumed silica, such a paste composition may give a "taily dispense", a term referring to a paste that does not break off cleanly from an automatic dispensing head. This results in a tail of paste dragging across a component during the assembly process, which may make the component unusable. When fumed silica is incorporated in the paste compositions of the invention, the amount will vary from about 0.2 to about 2 weight percent.

It has previously been discovered that the addition of small amounts of any one of a variety of bleed control agent(s) to adhesive formulations renders such compositions extremely resistant to resin bleed. Several different types of bleed control agents are contemplated for use in the practice of the present invention, e.g., cationic surfactants, tertiary amines, tertiary phosphines, amphoteric surfactants, polyfunctional compounds, and the like, as well as mixtures of any two or more thereof. Bleed control agents are discussed in more detail in PCT Application No. PCT/US96/04960, filed Apr. 11, 1996, which is hereby incorporated by reference herein.

It is well known to those skilled in the art that the thermo-oxidative stability of a high temperature polymer can be improved by the incorporation of an antioxidant. Use of an antioxidant in paste compositions containing high temperature polymers and finely divided silver can be very beneficial. Silver metal can act as an oxidation catalyst and contribute to early thermal degradation. This effect is especially evident when the filler employed is a high surface area silver powder. Moreover, the severity of the problem increases as the solids loading of silver powder increases. For example, thermal degradation onset for a paste loaded with 85 weight percent silver powder is about 390° C. A paste made with identical ingredients loaded to only 80 weight percent silver powder has a decomposition onset around 400° C. It is desirable to be able to load the silver content as high as possible in order to obtain the highest possible thermal and electrical conductivity. Incorporation of about 0.5 to about 1.0 weight percent of an antioxidant can substantially improve the thermal stability of attach paste compositions. The onset of thermal decomposition for an attach paste containing 85 weight percent silver powder and 0.5 weight percent antioxidant was 410° C. The onset for thermal decomposition of a control paste containing no antioxidant was approximately 20° C. lower.

Antioxidants that are suitable for use in the attach paste compositions of the invention include, for example, 4,4'-dioctyldiphenylamine, 3,3'-diethyl-5,5'-dinonyldiphenyl amine, tris(2,4-di-tert-butyl phenyl)phosphite, tetrakis(2,4-di-tert-butyl phenyl)-4,4'-biphenylene diphosphonite, phosphited polyalkyl polyphenols such as Geltrol™ brand phosphited polyalkyl polyphenol sold by Goodyear (Akron, Ohio), and the like.

The currently most preferred composition according to the invention comprises 15 to 25 weight percent monomer vehicle comprising 1,1-bis(4-cyanatophenyl)ethane (Arocy L-10™) and the diglycidyl ether of bisphenol F (Epiclon 830LVP™); 75 to 85 weight percent silver filler; 50 to 500 ppm cobalt acetylacetonate; and 0.1 up to 2 weight percent curimide-24™. In a most preferred embodiment, the monomer vehicle comprises about 1–2 parts L-10™ per part Epiclon 830LVP™ on a molar basis. In place of L-10™ and Epiclon 830LVP™, it is also preferred to use 1,3-bis[2-(4-cyanatophenyl)propyl]benzene (RTX-366™; Ciba-Geigy) and the diglycidyl ester of a dimer acid (e.g., Heloxy 71™; Shell).

The improvements derived by practicing the present invention become particularly apparent when curing the cyanate ester/epoxy containing compositions. Curing (polymerization) of the monomers occurs when the composition is exposed to the appropriate temperature conditions. The progress of the curing reaction may be monitored and graphed against the temperature by differential scanning calorimetry (DSC). Of course, the DSC only directly measures the occurrence of exothermic and endothermic events, but these events may be accurately correlated with the curing reactions occurring in the composition being tested.

In an optimal curing reaction, DSC analysis will reveal only a single peak that occurs at approximately the activation temperature for the reaction. The beginning of the reaction is signaled by an increase in heat flow into the control cell relative to the test cell of the DSC. This is referred to as the onset temperature, or T1, for the reaction. Preferably T1 is no higher than about 200° C., as higher temperatures can be damaging to the components being bonded by the paste composition. Most preferably, T1 is less than about 175° C. On the other hand, it is also preferred that T1 not be too low (e.g., below 80° C.), as a low T1 means that the pot life of the composition will be short, as the composition will cure to a substantial degree while merely sitting in the pot at room temperature.

As the heat generated by the sample in the calorimeter continues to increase during the curing reaction, a peak is observed on the graphical DSC output. The apex of the peak correlates with the maximum rate of the curing reaction. This peak is referred to as the primary cure event, or T2. It is also preferred that T2 not be higher than about 200° C., and more preferably that T2 not be higher than about 175° C.

The difference between T1 and T2 is directly related to how quickly the curing reaction proceeds (i.e., how "snappy" the reaction is). This difference is referred to herein as ΔT. A smaller ΔT represents shorter elapsed time between the onset of cure and the point of maximal curing; smaller ΔT's are preferred, and is one of the improvements achieved by the present invention. Preferably, ΔT will be less than about 30° C. Most preferably, ΔT will be less than about 15° C.

The DSC can also measure the heat derived from the reaction. Since the weight of the sample is input into the DSC prior to running each experiment, this heat output can be expressed as Joules/gram (J/g) for each sample. As a generalization, the higher the J/g for a sample, the more thermally stable the resulting resin will be after curing. As this generalization is not always accurate, the greatest benefit of monitoring the J/g for a curing reaction is in quality control. An incorrect J/g is a strong indicator that something is wrong with a composition, for example, the wrong components are being added, the wrong amounts are being added, a decomposed or otherwise faulty component is being used, and the like.

It is strongly preferred that the graphical DSC analysis results in a single peak (a monomodal reaction). If multiple peaks are seen in the DSC analysis, then the curing reaction is occurring in multiple stages, or the cyanate ester and epoxy monomers are curing at separate times. Multiple DSC peaks could also indicate that there are impurities present in the composition. Compositions that cure in a multimodal manner are more likely to be incompletely cured, to result in weaker bonds that are more likely to fail, have an increased chance of inconsistent post-cure properties (e.g., change of paste modulus over time), and the like. The primary benefit of a monomodal cure is that such cures are much more likely to be "snappy" and relatively complete.

The present invention improves upon the prior cyanate ester thermosetting resins by including an epoxy monomer (s) in the monomer vehicle, as well as an imidazole catalyst for the added epoxy monomer(s). It is also within the scope of the present invention to include other monomers in addition to epoxy compounds in the monomer vehicle. In such embodiments, the additional monomers include diallyl ethers, dimethacrylates, dipropargyl ethers, propargyl allyl ethers, monomaleimides, bismaleimides, and the like, as well as mixtures of any two or more such monomers.

The invention will now be described in greater detail by reference to the following non-limiting EXAMPLES.

EXAMPLES

Various samples (typically 20–25 mg/sample) comprising cyanate esters and/or cyanate ester-epoxy combinations, as detailed below in Table 1, were subjected to analysis by DSC. The ramp rate was 10° C. per minute from ambient temperature to 300° C. All test runs were performed under an air purge in open aluminum pans. The DSC instrument used was a dual cell 9125 model from TA Instruments, using a "9900" operating system.

In Table 1, the column labeled "Cyanate" identifies the cyanate ester used in each sample. The column labeled "Epoxy 1" identifies the first epoxy. The column labeled "Epoxy 2" identifies the second epoxy, if any, used in each In Table 1 below, the following shorthand terminologies are utilized:

"L-10" for 1,1-bis(4-cyanatophenyl)ethane;

"PPGDGE" for poly(propylene glycol) diglycidyl ether;

"RSL-2007" for diglycidyl ether of bisphenol F;

"RTX-366" for 1,3-bis[2-(4-cyanatophenyl)propyl] benzene;

"C-24" for Curimide-24™; and

"2-U" for 2-undecylimidazole.

TABLE 1

| Sample | Cyanate | Epoxy 1 | Epoxy 2 | Cyanate:Epoxy | Metal (ppm) | Imidazole (weight %) | T1 | T2 | ΔT | J/g | 2° peaks | Equiv. weight of epoxy |
|---|---|---|---|---|---|---|---|---|---|---|---|---|
| 1 | L-10 | PPGDGE | — | 1:1 | — | C-24 (5) | 208.23 | 237.04 | 28.81 | 261 | Y | 320 |
| 2 | L-10 | PPGDGE | — | 1:1 | Co (500) | — | 157.39 | 183.89 | 26.50 | 279 | Y | 320 |
| 3 | L-10 | PPGDGE | — | 1:1 | Zn (290) | C-24 (4.8) | 181.29 | 192.88 | 11.59 | 272 | Y | 320 |
| 4 | L-10 | PPGDGE | — | 1:1 | Al (290) | C-24 (4.8) | 214.84 | 222.66 | 7.82 | 280 | ? | 320 |
| 5 | L-10 | PPGDGE | — | 1:1 | Zn (290) | 2-U (4.8) | 187.25 | 198.81 | 11.56 | 308 | Y | 320 |
| 6 | L-10 | PPGDGE | — | 1:1 | Al (290) | 2-U (4.8) | 217.77 | 225.99 | 8.22 | 326 | ? | 320 |
| 7 | L-10 | PPGDGE | RSL-2007 | 1:1 | Co (140) | C-24 (3.9) | 198.35 | 210.11 | 11.76 | 265 | Y | 320 |
| 8 | L-10 | PPGDGE | RSL-2007 | 1:1 | Co (215) | C-24 (6.0) | 195.22 | 205.58 | 10.36 | 305 | Y | 279 |
| 9 | L-10 | PPGDGE | RSL-2007 | 1:1 | Co (170) | C-24 (4.8) | 193.92 | 201.48 | 7.56 | 360 | ? | 238 |
| 10 | L-10 | PPGDGE | RSL-2007 | 1:1 | Co (153) | C-24 (4.3) | 193.13 | 200.39 | 7.26 | 362 | N | 222 |
| 11 | L-10 | PPGDGE | RSL-2007 | 1:1 | Co (189) | C-24 (5.3) | 191.13 | 197.78 | 6.65 | 374 | N | 197 |
| 12 | L-10 | PPGDGE | RSL-2007 | 1:1 | Co (177) | C-24 (5.0) | 188.06 | 195.51 | 7.45 | 435 | N | 156 |
| 13 | L-10 | RSL-2007 | — | 1:1 | Co | — | 154.44 | 179.64 | 25.20 | 515 | Y | 156 |
| 14 | L-10 | PPGDGE | — | 1:2.3 | Co (150) | — | 154.66 | 185.07 | 30.41 | 234 | Y | 320 |
| 15 | L-10 | PPGDGE | — | 1:1 | Co (250) | — | 155.52 | 178.64 | 23.12 | 461 | Y | 320 |
| 16 | L-10 | RSL-2007 | — | 1:1.6 | Co (165) | C-24 (4.6) | 189.71 | 192.29 | 2.58 | 40 | N | 156 |
| 17 | L-10 | RSL-2007 | — | 1:1.4 | Co (179) | C-24 (5.0) | 191.00 | 193.84 | 2.84 | 88 | N | 156 |
| 18 | L-10 | RSL-2007 | — | 1:1.2 | Co (195) | C-24 (5.5) | 189.79 | 192.20 | 2.41 | 45 | N | 156 |
| 19 | L-10 | RSL-2007 | — | 1:1.1 | Co (205) | C-24 (5.7) | 188.53 | 191.45 | 2.92 | 46 | N | 156 |
| 20 | L-10 | RSL-2007 | — | 1:0.91 | Co (207) | C-24 (5.8) | 188.19 | 190.94 | 2.75 | 45 | N | 156 |
| 21 | L-10 | RSL-2007 | — | 1:0.83 | Co (198) | C-24 (5.6) | 189.83 | 192.94 | 3.11 | 650 | N | 156 |
| 22 | L-10 | RSL-2007 | — | 1:1 | Er (670) | — | 162.94 | 189.19 | 26.25 | 53 | Y | 156 |
| 23 | L-10 | RSL-2007 | — | 1:1 | Yb (650) | — | 163.53 | 188.07 | 24.54 | 51 | Y | 156 |
| 24 | L-10 | RSL-2007 | — | 1:1 | Er (670) | C-24 (2.2) | 197.80 | 201.93 | 4.13 | 49 | N | 156 |
| 25 | L-10 | RSL-2007 | — | 1:1 | Yb (650) | C-24 (2.2) | 195.95 | 199.60 | 3.65 | 48 | N | 156 |
| 26 | RTX-366 | Heloxy 71 | Heloxy 68 | 2:3 | Cu (1000) | — | 191.75 | 229.68 | 37.93 | 195 | Y | 340 |
| 27 | RTX-366 | Heloxy 71 | Heloxy 68 | 2:3 | — | C-24 (5.0) | 182.96 | 192.66 | 9.7 | 244 | Y | 340 |
| 28 | RTX-366 | Heloxy 71 | Heloxy 68 | 2:3 | Cu (1000) | C-24 (5.0) | 169.34 | 181.68 | 12.34 | 250 | N | 340 | sample. The column labeled "Cyanate:Epoxy" identifies the molar ratio between the cyanate ester and the epoxy(ies) used in each sample. The column labeled "Metal" identifies the metal catalyst added to each sample, and its ppm concentration relative to the cyanate ester monomer. The column labeled "Imidazole" identifies the imidazole catalyst added to each sample, and the weight percent of the imidazole relative to the epoxy monomer(s).

Also in Table 1, the column labeled "T1" identifies the onset temperature of the primary curing peak. The column labeled "T2" identifies the temperature at which the reaction represented by the primary peak is occurring at its maximum rate. The column labeled "ΔT" identifies the temperature difference between T1 and T2. J/g for each primary reaction peak is given in the column labeled as such. The column labeled "2° peaks" indicates in a simple yes or no format whether significant peaks were present in addition to the primary curing peak. A "?" appearing in the secondary peaks column indicates that a secondary peak was present (often as a shoulder to the primary peak), but that it is questionable whether the secondary peak was significant. The column labeled "equivalent weight" gives the average formula weight for the epoxy(ies) used in each sample in terms of grams per mole of epoxy functional groups.

Figure 2:
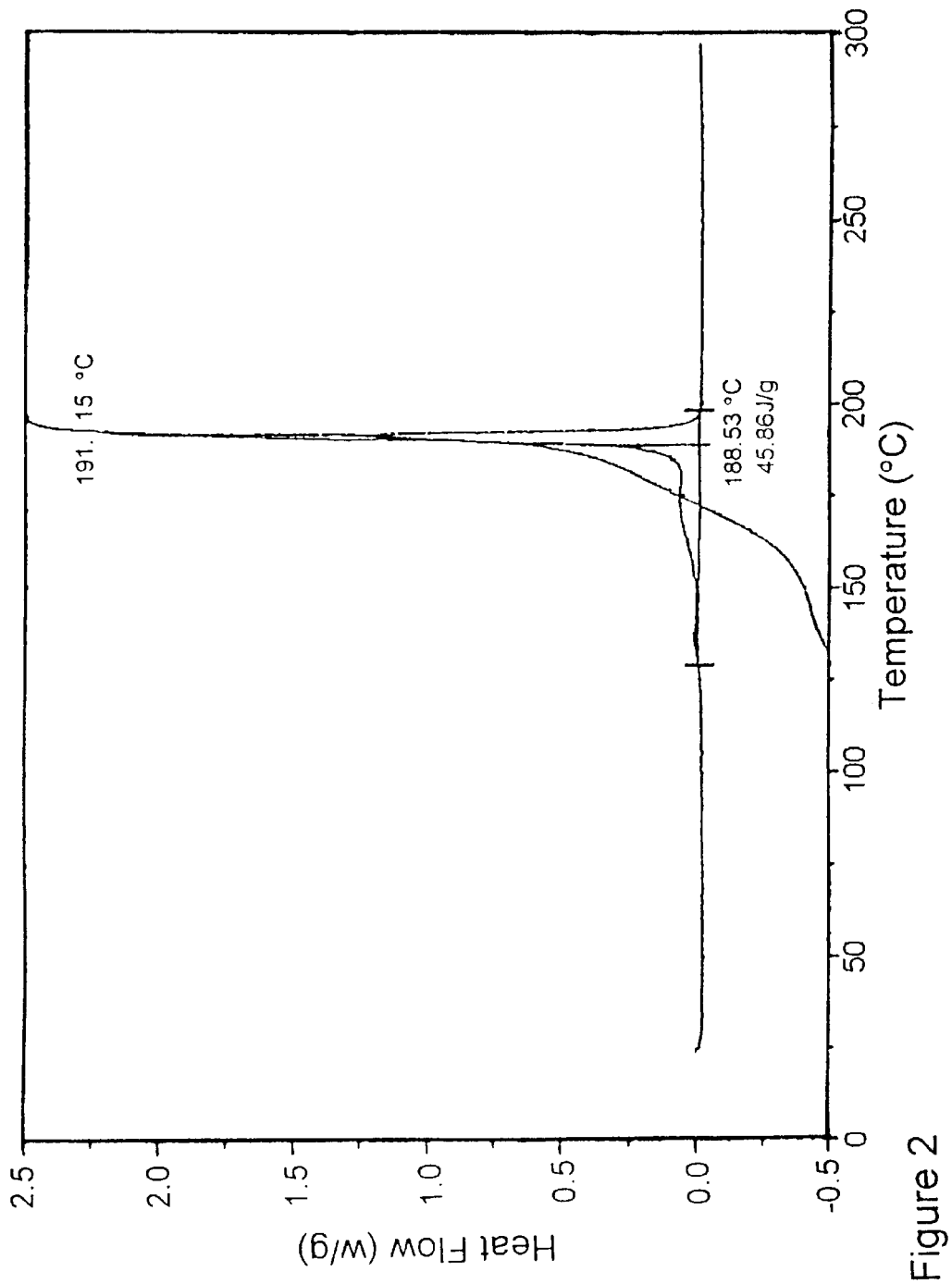
FIG. 2 presents the graphical result of the differential scanning calorimetry analysis of sample 19 (see Table 1 for full details). Sample 19 included cyanate and epoxy monomers in a 1:1.1 ratio, along with a cobalt catalyst and an imidazole catalyst, and presented an excellent monomodal and snappy reaction profile when cured.

The most significant fact derived from the experiments summarized in Table 1 is that no sample generated an acceptable curing profile without the presence of both a metal catalyst and an imidazole catalyst. Every sample that did not contain an imidazole catalyst included secondary peaks, and generally the primary peak had a ΔT that was larger than preferred. This can be clearly seen in FIGS. 1 and 2. FIG. 1 shows the results of sample 13, which included a metal catalyst but no imidazole. Two reaction events are seen, both of which demonstrate extremely broad peaks, indicating that the reactions were slow to occur. In contrast, FIG. 2 shows the result of sample 19, which included both a metal and imidazole catalyst in approximately the same mixture of cyanate ester and epoxy monomers. Only a single, sharp peak is seen, indicating that the reaction was both snappy, and that the monomers cured simultaneously. This is strongly indicative of a superior product.

The importance of the particular catalysts used is readily demonstrated by samples 3–6. Samples 3–6 contained the same cyanate esters and epoxy monomers in the same amounts. While catalysts were also provided in the same amounts, different catalysts were provided in each sample. A comparison of samples 4 and 6 (metal catalyst was ZnAcAc) with samples 3 and 5 (metal catalyst was AlAcAc) shows that each metal has benefits and detriments when compared to the other. Zinc-catalyzed curing reactions had lower onset temperatures (T1 of 181 or 187° C. versus 214 or 217° C., respectively); whereas aluminum-catalyzed curing reactions had snappier cures (lower ΔTs of about 8° C. versus about 11.5 C), higher J/g (326 and 280 J/g versus 308 and 272 J/g, respectively), and smaller secondary peaks. Thus, while neither metal is ideal for all situations, each had advantages which would be of interest depending on the particular end use contemplated.

Samples 3–6 can also be used to compare different imidazole catalysts. While the variation in metal catalysts demonstrated a greater overall effect, the C-24 imidazole catalyst clearly lowered T1 and T2 in every sample, relative to the 2-undecylimidazole catalyst. While these samples demonstrate why C-24 is the presently preferred imidazole catalyst, the 2-undecylimidazole catalyst might be preferred with respect to other properties not measured in these experiments.

Samples 7–12 provide very clear evidence that epoxy monomers having lower molecular weights, and thereby higher functional density, provide superior cures when compared to higher molecular weight epoxy monomers. The only variation in composition in samples 7–12 is in the relative amounts of PPGDGE and RSL-2007™. In each of these samples the same molar ratio of 1:1 is maintained between the L-10 cyanate ester monomer and the total epoxy present. However, in each sample the relative amounts of PPGDGE and RSL-2007™ are varied as follows:

| Sample # | PPGDGE | RSL-2007 |
|---|---|---|
| 7 | 1.0 | 0 |
| 8 | 0.75 | 0.25 |
| 9 | 0.50 | 0.50 |
| 10 | 0.40 | 0.60 |
| 11 | 0.25 | 0.75 |
| 12 | 0 | 1.0 |

As can be seen in Table 1, as the relative amount of RSL-2007™ increases, the equivalent weight of the total epoxy monomer in the sample decreases, and thus the functional density of the epoxy monomer increases. Simultaneously, T1, T2, and ΔT all decrease, while the J/g increases, and the secondary peak regresses. All of this confirms the observation that lower molecular weight epoxy monomers are generally preferred. It also indicates that the curing properties of the composition can be adjusted by mixing together different monomers to produce a composition with the desired final properties.

Samples 16–21 were prepared and analyzed to test the effect of varying the relative amounts of cyanate ester and epoxy monomers. While the cyanate:epoxy molar ratio for these six samples was varied from 1.6:1 down to 1:0.83, the observed properties for each sample remained remarkably consistent. All samples produced extremely clean primary peaks, and the T1, T2, ΔT, and J/g numbers remained essentially unchanged from sample to sample. Thus, although a molar ratio of 1:1 is preferred in the practice of the present invention, this is not a critical factor.

Hydrophobic monomers provide moisture resistance properties by way of the hydrophobic backbone to which the reactive functional groups are attached in each monomer. The size of this hydrophobic aliphatic or aromatic midgroup must, of necessity, be relatively large. The advantage of catalyst cure synergism as demonstrated in the present invention is reduced by the presence of these large hydrophobic moieties, but is still significant for monomers of this type. Samples 26–28 demonstrate evidence of this, as these samples utilized three highly hydrophobic cyanate ester and epoxy monomers. The monomer mixture was a 2:2:1 ratio combination of RTX-366™, Heloxy 71™, and Heloxy 68™. When only Cu was used as a catalyst, a broad, bimodal exotherm was seen. The use of only Curimide-24™ greatly improved performance, although the combination of both the Cu and Curimide-24™ catalysts clearly provided the best cure properties. This result again demonstrates the importance of the imidazole catalyst, as well as the synergism that is obtained by combining the imidazole with a transition metal catalyst.

While the invention has been described in detail with reference to certain preferred embodiments thereof, it will be understood that modifications and variations are within the spirit and scope of that which is described and claimed.

That which is claimed is:

1. A composition for attaching a semiconductor device to a substrate, said composition comprising:
    a liquid monomer vehicle comprising at least one hydrophobic cyanate ester monomer and at least one epoxy monomer;
    a filler;
    50 to 1500 ppm, on a metals basis, relative to the cyanate ester monomer, of a metal catalyst; and
    0.5 to 10 weight percent, based on the epoxy monomer, of an imidazole,
wherein said monomer vehicle has low levels of hydrolyzable chloride.

2. A composition according to claim 1 wherein said epoxy monomer has the structure:

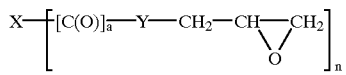

wherein:
    X is a monovalent or polyvalent aliphatic moiety, a substituted aliphatic moiety, an aromatic moiety, a substituted aromatic moiety, or a polyether moiety;
    Y is O or NR, wherein R is

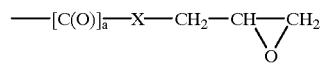

a=0 or 1,
    n=1, 2, 3 or 4.

3. A composition according to claim 1 wherein said epoxy monomer is selected from the group consisting of diglycidyl ether of bisphenol F, poly(propylene glycol) diglycidyl ether, N,N,N',N'-tetraglycidyl-4,4'-diaminodiphenylmethane, triglycidyl tris(hydroxy phenyl) methane, glycidated phthalic acid, glycidated isophthalic acid, glycidated terephthalic acid, glycidated p-amino phenol, glycidated bisphenol E, glycidyl ether of bisphenol F, bisglycidyl ether of Bisphenol A, and glycidated dimer acid.

4. A composition according to claim 1 wherein said cyanate ester monomer is selected from the group consisting of 1,1-bis(4-cyanatophenyl)methane, 1,1-bis(4-cyanatophenyl)ethane, 2,2-bis(4-cyanatophenyl)propane, 1,3-bis[2-(4-cyanatophenyl) propyl]benzene, and 1,1-bis(4-cyanato-3,5-dimethyl phenyl)methane.

5. A composition according to claim 1 wherein the molar ratio of cyanate ester to epoxy monomer falls in the range of about 1:2 up to about 5:1.

6. A composition according to claim 1 wherein the molar ratio of cyanate ester to epoxy monomer falls in the range of about 1:1 up to about 3:1.

7. A composition according to claim 1 wherein said composition is substantially free of non-reactive diluents.

8. A composition according to claim 1 wherein said metal catalyst is selected from the group consisting of divalent chelates of cobalt, manganese, tin, zinc, copper or nickel; trivalent chelates of manganese, iron, cobalt or aluminum; tetravalent chelates of titanium; and metal soaps of all of the above.

9. A composition according to claim 1 wherein said imidazole has the structure:

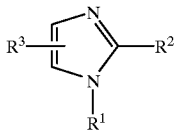

wherein:
$R^1$ is selected from the group consisting of hydrogen, alkyl, aryl, and cyano moieties;
$R^2$ is selected from the group consisting of hydrogen, alkyl, aryl, and cyano moieties; and
$R^3$ is selected from the group consisting of hydrogen, alkyl, substituted alkyl, alkylaryl, and substituted alkylaryl moieties.

10. A composition according to claim 9 wherein said imidazole is selected from the group consisting of 2-ethyl-4-methyl imidazole, 1-methyl imidazole, 2-methyl imidazole, 2-undecylimidazole, and 2-phenyl imidazole, and imidazole.

11. A composition according to claim 1 wherein said filler is present in the range of about 60 up to about 92 weight percent, and said monomer vehicle is present in the range of about 8 up to about 40 weight percent.

12. A composition according to claim 11 wherein said filler is an electrically conductive material.

13. A composition according to claim 12 wherein said filler is rendered substantially free of catalytically active metal ions.

14. A composition according to claim 12 wherein said filler is selected from the group consisting of silver, nickel, gold, cobalt, copper, aluminum, graphite, silver-coated graphite, nickel-coated graphite, and mixtures thereof.

15. A composition according to claim 12 wherein said filler is silver.

16. A composition according to claim 11 wherein said filler is a thermally conductive material.

17. A composition according to claim 16 wherein said filler is selected from the group consisting of aluminum oxide, aluminum nitride, boron nitride, silicon carbide, diamond, graphite, beryllium oxide, magnesia, and silica.

18. A composition according to claim 11 wherein said filler is selected from the group consisting of alumina, silicon dioxide, perfluorinated hydrocarbon polymers, thermoplastic polymers, thermoplastic elastomers, and mica.

19. A composition according to claim 1 further comprising an antioxidant selected from the group consisting of 4,4'-dioctyldiphenylamine, 3,3'-diethyl-5,5'-dinonyldiphenyl amine, tris(2,4-di-tert-butyl phenyl) phosphite, tetrakis(2,4-di-tert-butyl phenyl)-4,4'-biphenylene diphosphonite, and phosphited polyalkyl polyphenols.

20. A composition according to claim 1 wherein said monomer vehicle comprises:
only liquid monomers,
a combination of solid monomer(s) and liquid monomer(s), wherein said solid monomer(s) are miscible and/or soluble in said liquid monomer(s), or
a combination of solid monomers which, when combined, provide a liquid monomer mixture.

21. A composition according to claim 20 wherein said monomer vehicle comprises only liquid monomers.

22. A composition according to claim 21 wherein said epoxy monomer is the diglycidyl ether of bisphenol F, and said cyanate ester is
1,1-bis(4-cyanatophenyl)ethane;
1,3-bis[2-(4-cyanatophenyl)propyl]benzene; or
eutectic blends thereof that optionally include 1,1-bis(4-cyanato-3,5-dimethyl phenyl)methane or 2,2-bis(4-cyanatophenyl)propane.

23. A composition according to claim 20 wherein said monomer vehicle comprises a combination of solid monomer(s) and liquid monomer(s), wherein said solid monomer(s) are miscible and/or soluble in said liquid monomer(s).

24. A composition according to claim 23 wherein said liquid monomer is 1,1-bis(4-cyanatophenyl)ethane and said solid monomer is:
1,1-bis(4-cyanato-3,5-dimethyl phenyl)methane;
2,2-bis(4-cyanatophenyl)propane;
1,1,1,3,3,3-hexafluoro-2,2-bis(4-cyanatophenyl)propane; or
1,3-bis[2-(4-cyanatophenyl)propyl]benzene.

25. A composition according to claim 20 wherein said monomer vehicle comprises a combination of solid monomers which, when combined, provide a liquid monomer mixture.

26. A composition according to claim 25 wherein said cyanate ester is:
1,1-bis(4-cyanato-3,5-dimethyl phenyl)methane;
1,1,1,3,3,3-hexafluoro-2,2-bis(4-cyanatophenyl)propane;
2,2-bis(4-cyanatophenyl)propane; or
1,3-bis[2-(4-cyanatophenyl)propyl]benzene; and
said epoxy monomer is:
diglycidyl ether of bisphenol F; or
diglycidyl ether of bisphenol A.

27. A composition according to claim 1 comprising:
a) 15 to 25 weight percent monomer vehicle comprising:
 i) 1,1-bis(4-cyanatophenyl)ethane, and
 ii) diglycidyl ether of bisphenol F;
b) 75 to 85 weight percent silver filler;
c) 50 to 500 ppm cobalt acetylacetonate; and
d) 0.1 up to 2 weight percent 2-ethyl-4-methyl imidazole.

28. A composition according to claim 27 wherein said monomer vehicle comprises about 1–2 parts 1,1-bis(4-cyanatophenyl)ethane per part diglycidyl ether of bisphenol F on a molar basis.

29. A composition according to claim 1 wherein said monomer vehicle further comprises additional monomer selected from the group consisting of diallyl ethers, dimethacrylates, dipropargyl ethers, propargyl allyl ethers, monomaleimides, bismaleimides, and mixtures of any two or more such monomers.

30. A composition for attaching a semiconductor device to a substrate, said composition consisting essentially of:
a liquid monomer vehicle comprising at least one hydrophobic cyanate ester monomer and at least one epoxy monomer;
a filler;
50 to 1500 ppm, on a metals basis, relative to the cyanate ester monomer, of a metal catalyst; and
0.5 to 10 weight percent, based on the epoxy monomer, of an imidazole,
wherein said monomer vehicle has low levels of hydrolyzable chloride.

* * * * *